US012345066B2

(12) United States Patent
Spicer et al.

(10) Patent No.: US 12,345,066 B2
(45) Date of Patent: Jul. 1, 2025

(54) LIFT SYSTEM FOR A SPA COVER

(71) Applicant: STRONG INDUSTRIES, INC., Northumberland, PA (US)

(72) Inventors: Wade Spicer, Northumberland, PA (US); Charles M. Woods, West Manchester, OH (US)

(73) Assignee: STRONG INDUSTRIES, INC., Northumberland, PA (US)

( * ) Notice: Subject to any disclaimer, the term of this patent is extended or adjusted under 35 U.S.C. 154(b) by 0 days.

(21) Appl. No.: 18/375,785

(22) Filed: Oct. 2, 2023

(65) Prior Publication Data

US 2024/0026699 A1 Jan. 25, 2024

Related U.S. Application Data

(63) Continuation of application No. 17/740,521, filed on May 10, 2022, now Pat. No. 11,808,050, and a continuation of application No. 16/774,210, filed on Jan. 28, 2020, now Pat. No. 11,359,396.

(60) Provisional application No. 62/797,768, filed on Jan. 28, 2019.

(51) Int. Cl.
*E04H 4/08* (2006.01)
*E05F 1/14* (2006.01)

(52) U.S. Cl.
CPC ............... *E04H 4/084* (2013.01); *E05F 1/14* (2013.01)

(58) Field of Classification Search
CPC ....... E04H 4/084; E05F 1/14; A61H 33/0087; A61H 33/02; A61H 33/6005
USPC ......................... 4/498, 494, 496, 502; 135/87
See application file for complete search history.

(56) References Cited

U.S. PATENT DOCUMENTS

| | | | | | |
|---|---|---|---|---|---|
| 6,032,305 | A * | 3/2000 | Tedrick | E04H 4/084 220/817 |
| 9,689,172 | B1 | 6/2017 | Genova | |
| 9,708,823 | B2 | 7/2017 | Cunerty et al. | |
| 10,273,702 | B1 * | 4/2019 | Cunerty | A47G 25/12 |
| 11,808,050 | B2 * | 11/2023 | Spicer | E05F 1/14 |
| 2007/0107118 | A1 | 5/2007 | Tudor | |
| 2007/0209103 | A1 * | 9/2007 | Buzzetti | E04H 4/084 4/498 |
| 2010/0154111 | A1 * | 6/2010 | Koren | E04H 4/084 4/500 |
| 2018/0230705 | A1 * | 8/2018 | Spicer | F16B 7/182 |

FOREIGN PATENT DOCUMENTS

WO 2016070269 5/2016

OTHER PUBLICATIONS

Canadian Office Action dated Dec. 2, 2024 for corresponding Canadian Application No. 3126083.
Extended European Search Report dated Nov. 14, 2024 in connection with corresponding European application No. 242057669.

* cited by examiner

*Primary Examiner* — Lori L Baker
(74) *Attorney, Agent, or Firm* — Grogan, Tuccillo & Vanderleeden LLP

(57) ABSTRACT

A lift system for a spa cover includes a first arm rotatable about a first pivotal connection with a side of a spa and pivotally connected to a spa cover, a lift mechanism configured to provide for rotation of the first arm about its pivotal connection to the side of the spa, and a mechanical linkage between the lift-assist device and the first arm.

17 Claims, 21 Drawing Sheets

LIFT SYSTEM FOR A SPA COVER

CROSS-REFERENCE TO RELATED APPLICATIONS

This application is a continuation application of U.S. patent application Ser. No. 17/740,521, filed on May 10, 2022, which is a continuation application of U.S. patent application Ser. No. 16/774,210 (now U.S. Pat. No. 11,359,396), filed on Jan. 28, 2020, which claims the benefit of U.S. Provisional Application Ser. No. 62/797,768, filed on Jan. 28, 2019, each of which are hereby incorporated by reference herein in their entireties.

FIELD OF THE INVENTION

The present invention relates generally to spas and hot tubs and, more particularly, to a lift assembly for opening and closing a spa cover.

BACKGROUND OF THE INVENTION

Spas, also commonly known as hot tubs, are popular fixtures that are used in many homes. They generally include a deep, vacuum formed tub having a smooth acrylic liner that is filled with heated water and which is used for soaking and relaxation. Spas typically include water jets for massage purposes.

Typically, the acrylic liner is formed into shapes that provide a variety of seating arrangements within the tub. Each seat is usually equipped with hydrotherapy jets that allow a pressurized flow of water to be directed at various parts of a user's body. The water flow may be aerated for additional effect, and some or all of the jets may also automatically move or rotate, causing the changing pressure of the water on the body to provide a massage like effect.

Because many spas/hot tubs are located outdoors, they are often equipped with covers for enclosing the tub when not in use. These covers help prevent dirt, leaves and other debris from entering the water, and provide a safety function by preventing children and animals from falling into the water. Moreover, spa covers are often insulated so as to limit heat loss from the water when the spa is not in use, for purposes of energy efficiency and readiness of use.

Both soft and hard covers are known in the art. Typical hard covers generally consist of a hollow plastic shell that can be filled with an insulating foam. Typical hard covers may be formed using a variety of molding methods, such as through rotational molding and blow molding, as well as vacuum forming. These hard covers, and even some soft covers, typically require some sort of lift mechanism to remove them from the spa. Many existing lift mechanisms are outfitted to the external cabinet or base of the spa, and can be cumbersome to operate, are unsightly, and contain a number of exposed components that can impede free movement around the spa.

In view of the above, there remains a need for a cover lifter system for a spa that has improved performance properties, repeatability, structural integrity, and ease of use.

SUMMARY OF THE INVENTION

It is an object of the present invention to provide a cover lift system for a spa.

It is another object of the present invention to provide an automated cover lift system for a spa.

It is another object of the present invention to provide an automated cover lift system having a clutch and release mechanism.

It is another object of the present invention to provide an automated cover lift system having a passive lifter mechanism.

These and other objects are achieved by the present invention.

A lift system for a spa cover includes a fist lift assembly associated with a first side of a spa, and a second lift assembly associate with an opposed, second side of the spa. The first lift assembly includes a motor for applying an uncovering force to a spa cover. The second lift assembly includes a compression spring exerting a generally downward force on the cover when the cover is in the closed position, and a generally upwards force on the cover when the cover is moved towards an open position to assist in an uncovering operation. The second lift assembly also includes a tension spring configured to exert an upward force on the cover when the cover is in the open position to assist the first lift assembly in a covering operation.

According to another embodiment of the present invention, a lift system for a spa cover includes a first lift assembly configured for coupling to a first side of a spa, the first lift assembly including a motor operable to move a spa cover between a an open position and a closed position, and a second lift assembly configured for coupling to a second side of the spa, the second lift assembly including at least one non-motorized lift-assist device configured to assist moving the cover from at least one of the closed position to the open position, and/or the open position to the closed position.

According to another embodiment of the present invention, a spa includes a housing defining an interior chamber for containing a volume of water, the chamber having an open upper end, a cover positionable over the housing for covering at least a portion of the open upper end, a first lift assembly in association with a first side of the housing and being operative to selectively remove and replace the cover over the open upper end of the housing, the first lift assembly including a motor, and a second lift assembly in association with a second side of the housing, the second side being opposite the first side, the second lift assembly being including at least one non-motorized lift-assist device configured to assist the first lift assembly with removal and replacement of the cover.

According to yet another embodiment of the present invention, a method of installing a cover lift system on a spa includes the steps of connecting a first end of a first lifter handle to a cover of a spa at a first side of the spa, connecting a second end of the first lifter handle a motor-driven lift assembly positioned interior to a sidewall of the spa at the first side, connecting a first end of a second lifter handle to the cover of the spa at a second side of the spa, and connecting a second end of the second lifter handle to a non-motorized lift-assist device positioned interior to the sidewall of the spa at the second side.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENT

Figure 1:
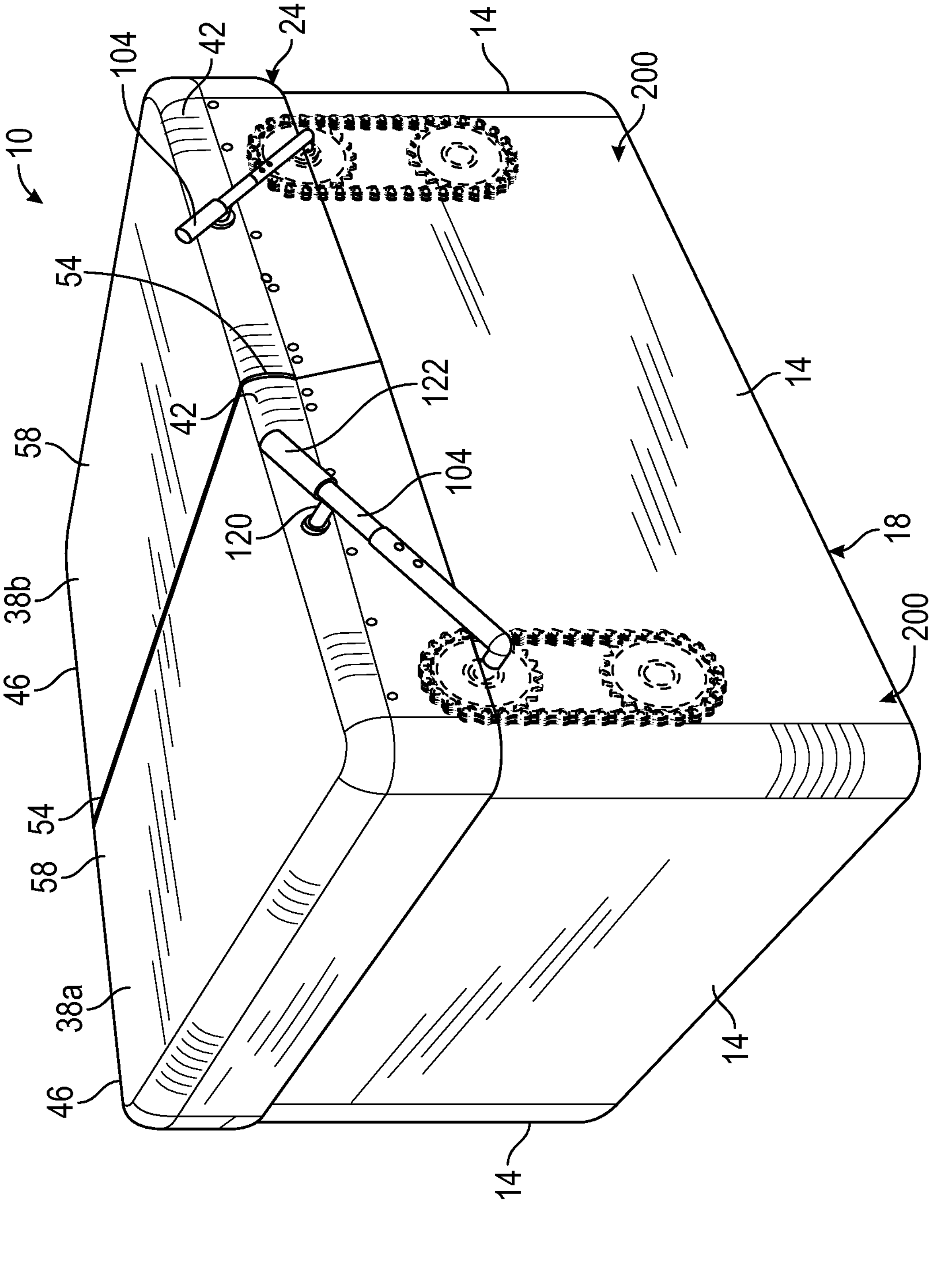
FIG. 1 is a perspective view of a spa having a cover lift system, according to an embodiment of the invention.

Referring to FIGS. 1-4, a spa 10 (also referred to as a hot tub) having a cover lift system according to an embodiment of the present invention is shown. The spa 10 includes sidewalls 14 and a bottom 18, which collectively define an interior chamber 22 (not shown) for containing a volume of water and one or more user occupants. The chamber 22 includes an open upper end 26 for user entry and exit.

Sidewalls 14 and bottom 18 may be configured to provide any suitable interior chamber 22. In the illustrated example, sidewalls 14 and bottom 18 define a rectangular footprint. In other embodiments, sidewalls 14 and bottom 18 may define a circular, triangular or other regular or irregularly-shaped footprint. In the illustrated example, the interior chamber is further defined by an inner tub positioned above bottom 18 between sidewalls 14 and is preferably contoured to provide seating for user occupants of spa 10, as is known in the art. Further, spa 10 may include one or more jets which extend through tub for injecting air and water into chamber below the water level inside the spa 10.

Spa 10 includes covers **38*a* and 38*b*, also referred to herein as cover members. Each cover 38 is positionable over the open upper end 26 of the chamber 22 for covering at least a portion of the open upper end 26. In the illustrated example, each cover 38 is equally sized and shaped to cover one half of the open upper end 26 of chamber. In alternative embodiments, each cover 38 may be differently sized and/or shaped to cover differently sized and/or shaped portions of the open upper end 26 of chamber 22. In some embodiments (not shown), spa 10 may include just one cover 38 sized to cover the entire open upper end 26. Each cover 38 may be movable between a closed position (shown by example in FIG. 1), in which the cover 38 rests on the open upper end 26, and an open position (shown by example in FIG. 4), in which the cover 38 is displaced from the open upper end 26. For example, covers 38 may be moved to their respective open positions to provide user access to chamber 22 through upper end 26, and moved to their respective closed positions after all users have exited the chamber 22**.

In the closed position, covers 38 may substantially seal chamber 22, and the water contained therein, from the external environment to mitigate entry of dirt/debris and loss of heat. Further, the water inside may be heated to temperatures of up to 40° C. or higher. The energy consumption required to heat such volumes of water is significant. Therefore, a spa cover may be configured to provide insulation against heat loss, thus accelerating water heating and conserving water temperature for future usage.

Figure 2:
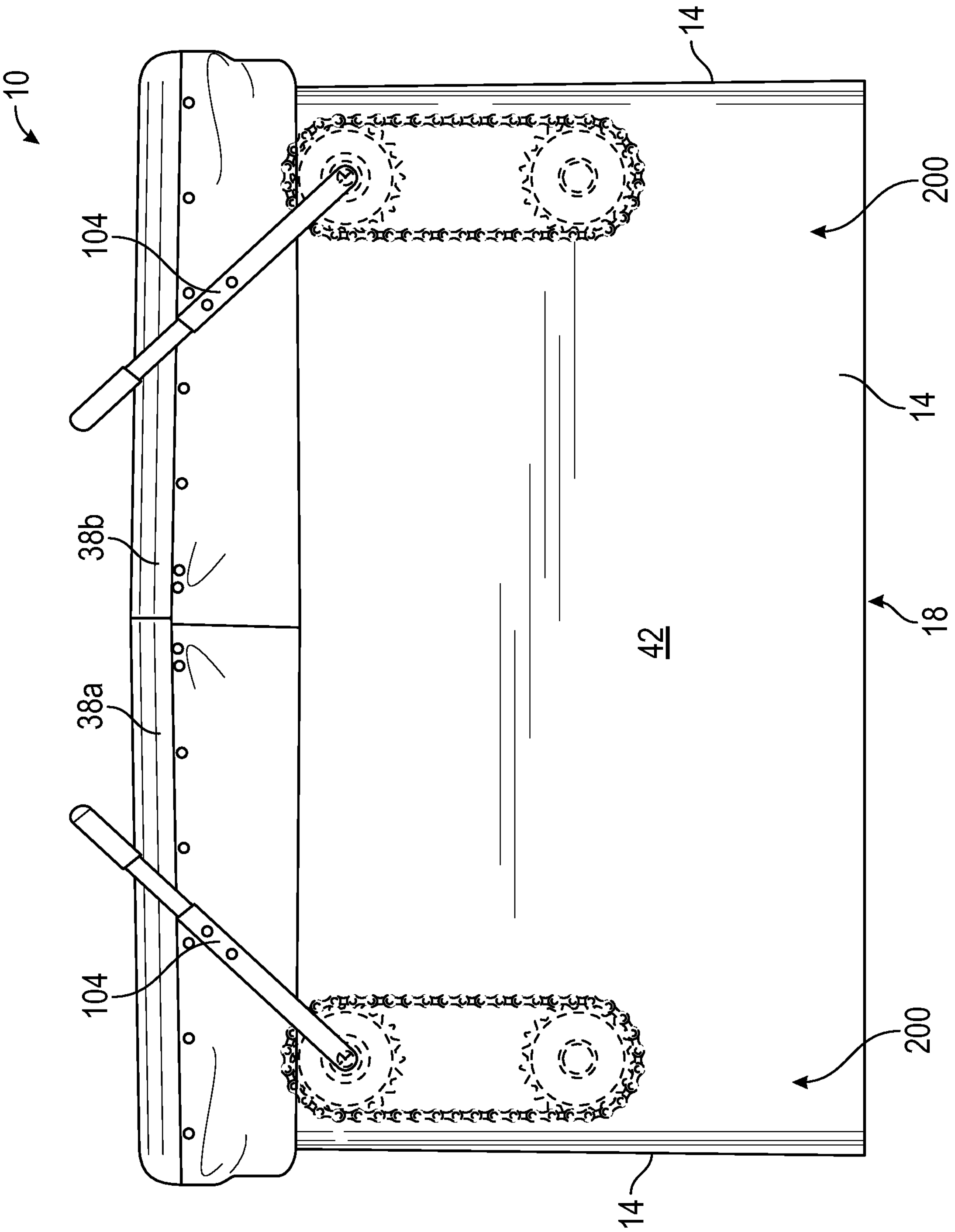
FIG. 2 is a side, elevational view of the spa of FIG. 1, illustrating a primary lift assembly of the cover lift system, according to an embodiment of the invention.
Figure 3:
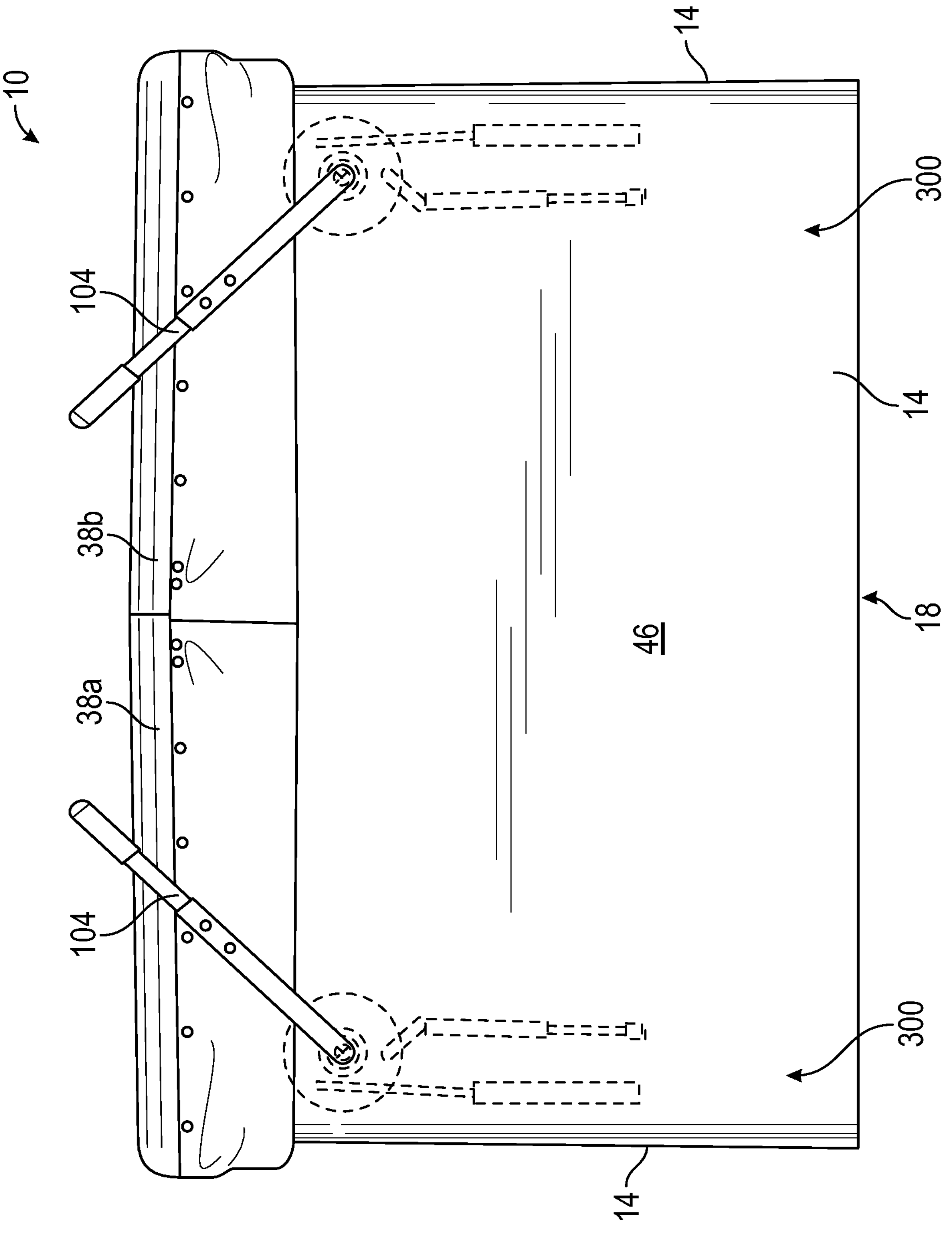
FIG. 3 is a side elevational view of the spa of FIG. 1, illustrating a secondary lift assembly of the cover lift system, located on an opposing side of the spa, according to an embodiment of the invention.
Figure 4:
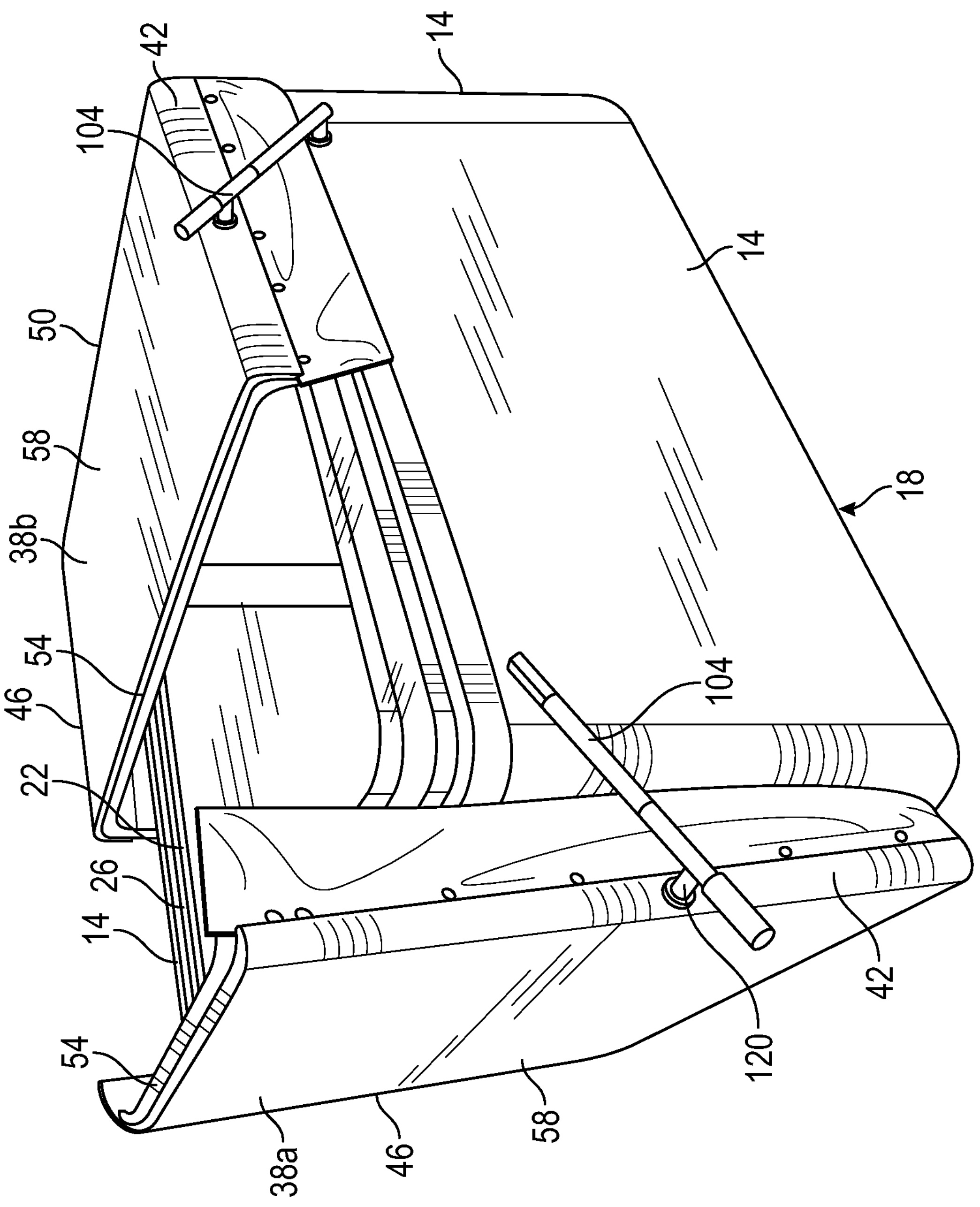
FIG. 4 is a perspective view of the spa of FIG. 1, showing a cover in an open position.

With further reference to FIGS. 1-3, each cover 38 is connected to at least one lift system/lift assembly which are used for selectively removing and replacing covers 38 over the upper end 26 of chamber 22. Preferably, lift assemblies 100 reduce the force required from a user to move covers 38 from the open position to the closed position, and optionally from the closed position to the open position. In an embodiment, each lift system includes a primary lift assembly 200 associated with a first side 42 of the spa 10, and a secondary or auxiliary lift assembly 300 associated with a second, opposing side 46 of the spa. In the preferred embodiment, the first and second lift assemblies 200, 300 are located interior to the sidewalls 14 of the spa, between the sidewalls 14 and the interior chamber 22.

As exemplified, each lift system includes a lever arm 104 for directing the movement of the connected cover 38 between the open and closed positions. Lever arm 104 is shown including a first end pivotally connected to a sidewall 14 of spa 10, and a second end spaced apart from the first end 108 and connected to a cover 38. In use, the second end may be rotated about the first end for moving the connected cover in an arcuate motion between the open and closed positions.

As shown, lever arm 104 may extend from the first end pivotally connected to sidewall 14 to an opposite second end connected to cover 38. In the illustrated example, the lever arm 104 includes a connecting portion or connecting rod 120 that extends through the cover 38 and connects the opposed primary and secondary lift assemblies 200, 300 (e.g. through the first ends of opposed lever arms 104). As shown, connecting portion 120 may penetrate cover 38 to form a rotatable connection with cover 38.

Optionally, lever arm 104 may further include a handle 122 that a user may grasp while manipulating lever arm 104 between the closed and open positions, in an optional manual mode of operation.

Each cover 38 may extend in width across spa 10 from a first cover side 42 to an opposite second cover side 46. As shown, the primary lift assembly 200 may be connected to cover 38 at first cover side 42, through the lever arm 104. In some embodiments, second lift assembly 100 may be connected to cover 38 at second cover side 46 (such as through an opposing lever arm). In particular lever arms 104 of first and second lift assemblies 200, 300 are joined through cross rod 120 that extends across a full width of the spa cover 38.

Lever arm 104 is preferably sized and positioned relative to sidewall 14 and cover 38 to provide clearance for cover 38 to move between the open and closed positions. As shown, cover 38 may be oriented substantially horizontally over chamber 22 in the closed position, and substantially vertically outboard of sidewall 14 in the open position.

Referring now to FIGS. 5-11, more detailed views of the primary lift assembly 200 are shown. In an embodiment, the primary lift assembly 200 is a motor-driven lift assembly of the type described in U.S. Pat. No. 10,526,807, which is hereby incorporated by reference herein in its entirety. As illustrated in FIGS. 5-11, the primary lift assembly 200 includes a first sprocket 204 operatively connected to the lever arm 104, a second sprocket 206 being generally coplanar with the first sprocket 204 and spaced from the first sprocket 204, and a drive chain 208 drivingly connecting the first sprocket 204 and the second sprocket 206. It is contemplated that the first and second sprockets 204, 206, and drive chain 208 may be positioned at any suitable location and, preferably, hidden behind sidewall 14.

The primary lift assembly 200 further includes an actuator configured to rotate at least one of the first sprocket 204 and second sprocket 206. For example, in an embodiment, the actuator may be a linear actuator 202 comprising a linear motor and linear drive shaft 203 connected to the drive chain 208. This configuration allows the first sprocket 204 to be driven by manipulating chain 208. In particular, in operation, extension of the linear drive shaft 203 causes the first sprocket 204 to rotate in the direction of arrow, A, while retraction of the linear drive shaft 203 causes the first sprocket 204 to rotate in the opposite direction, as indicated by arrow, B. In other embodiments, the first sprocket 204 may be rotated/driven by directly rotating the second sprocket 206 (e.g., by a motor having a rotational output), which is connected to the first sprocket 204 via chain 208. As discussed in detail below, rotation of the first sprocket 204 effects rotation of the lever arm 104, which is operatively connected thereto, thereby opening or closing the cover 38 to which the lever arm 104 is connected.

Figure 7:
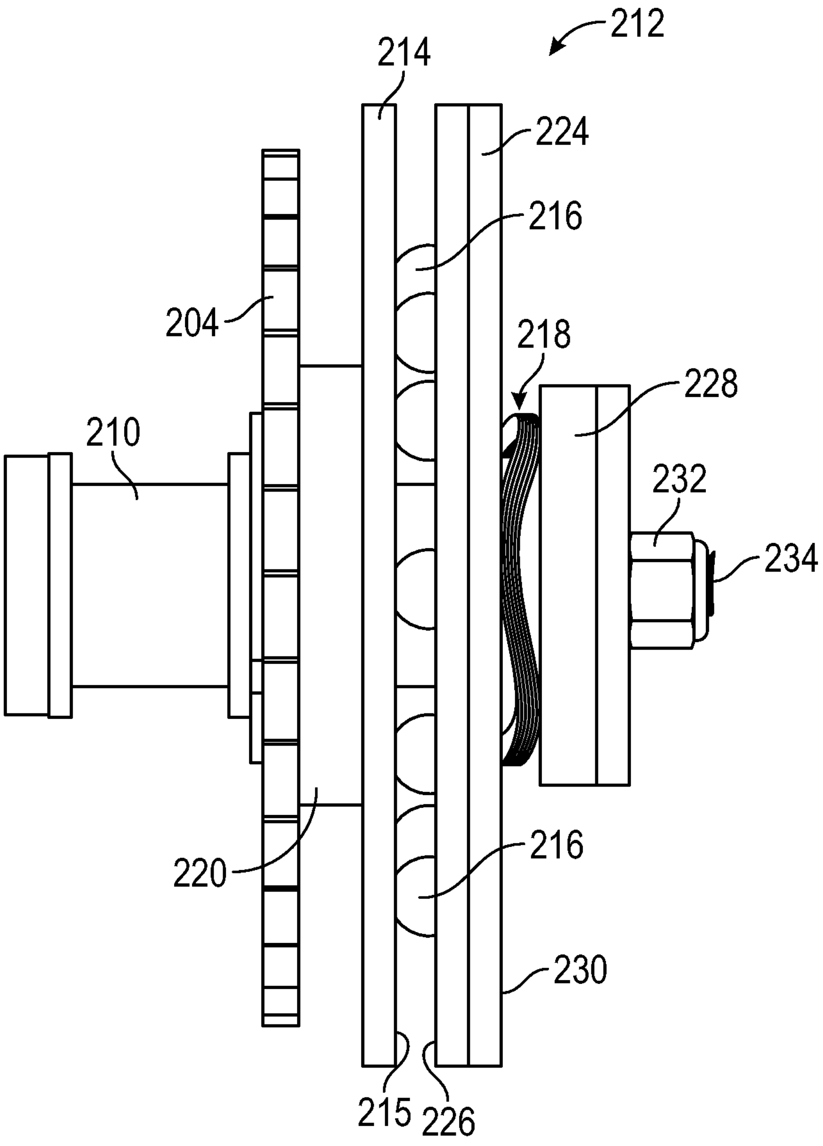
FIG. 7 is a side elevational view of the primary lift assembly, illustrating a clutch mechanism.
Figure 8:
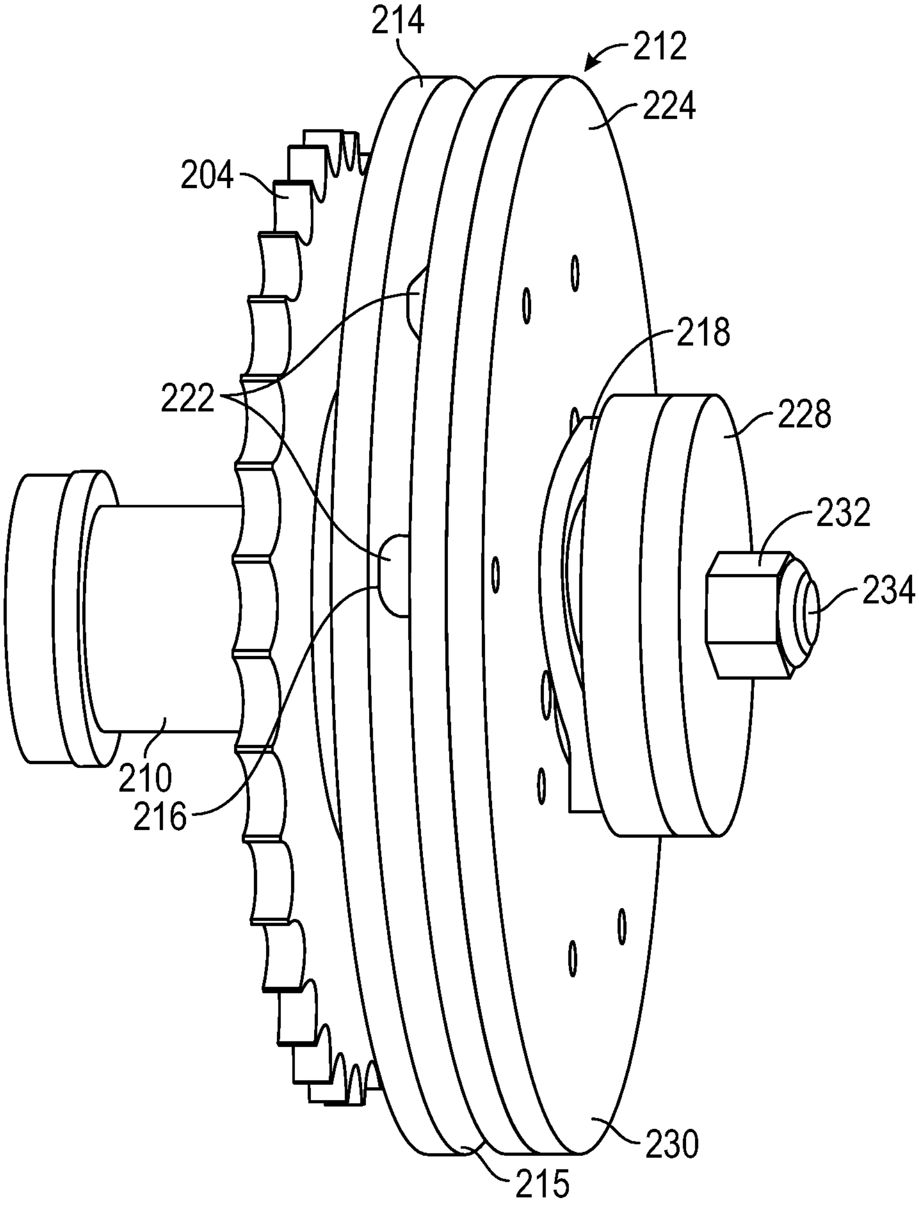
FIG. 8 is a perspective view of the primary lift assembly, illustrating the clutch mechanism.
Figure 9:
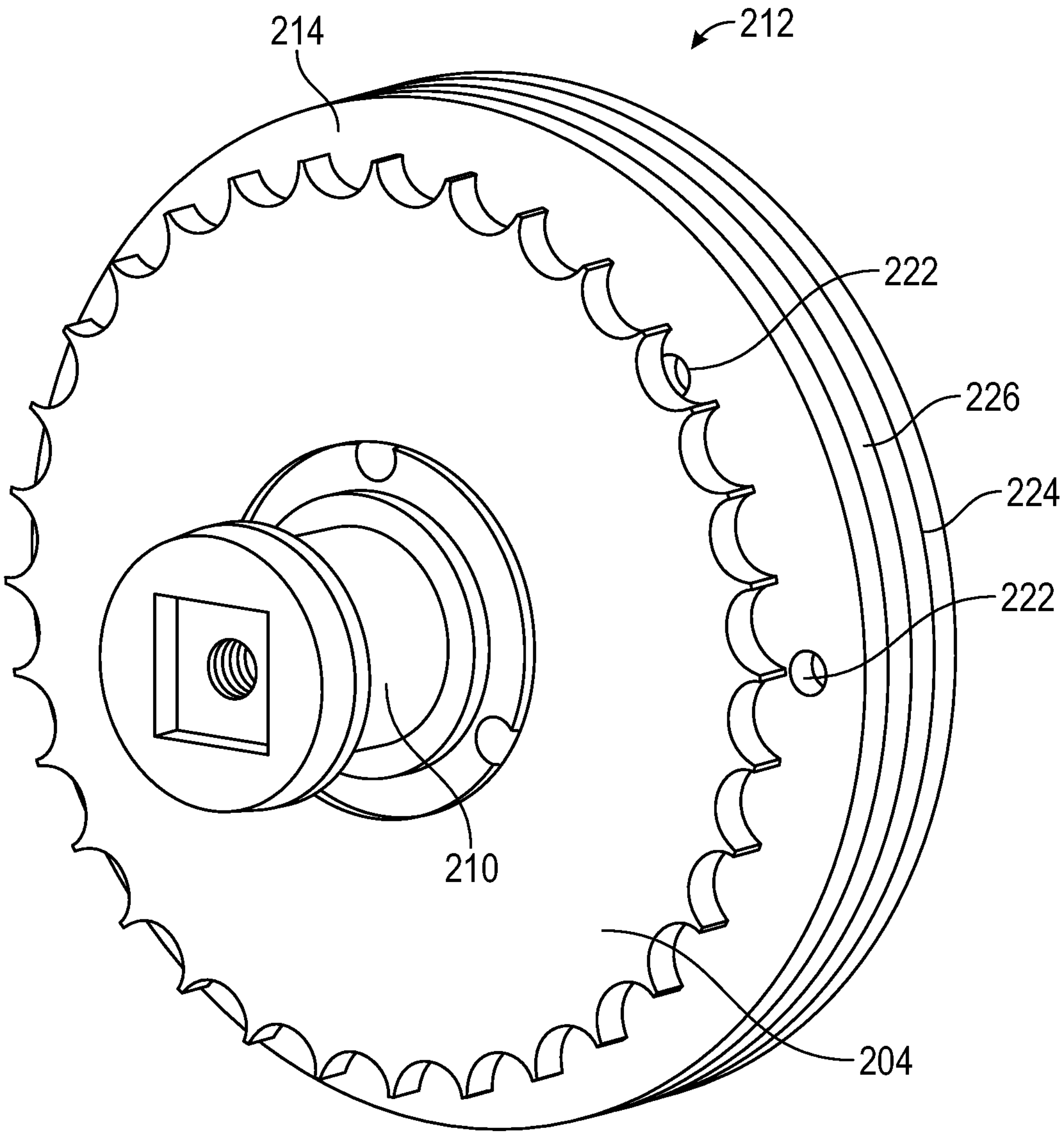
FIG. 9 is another perspective view of the primary lift assembly.
Figure 10:
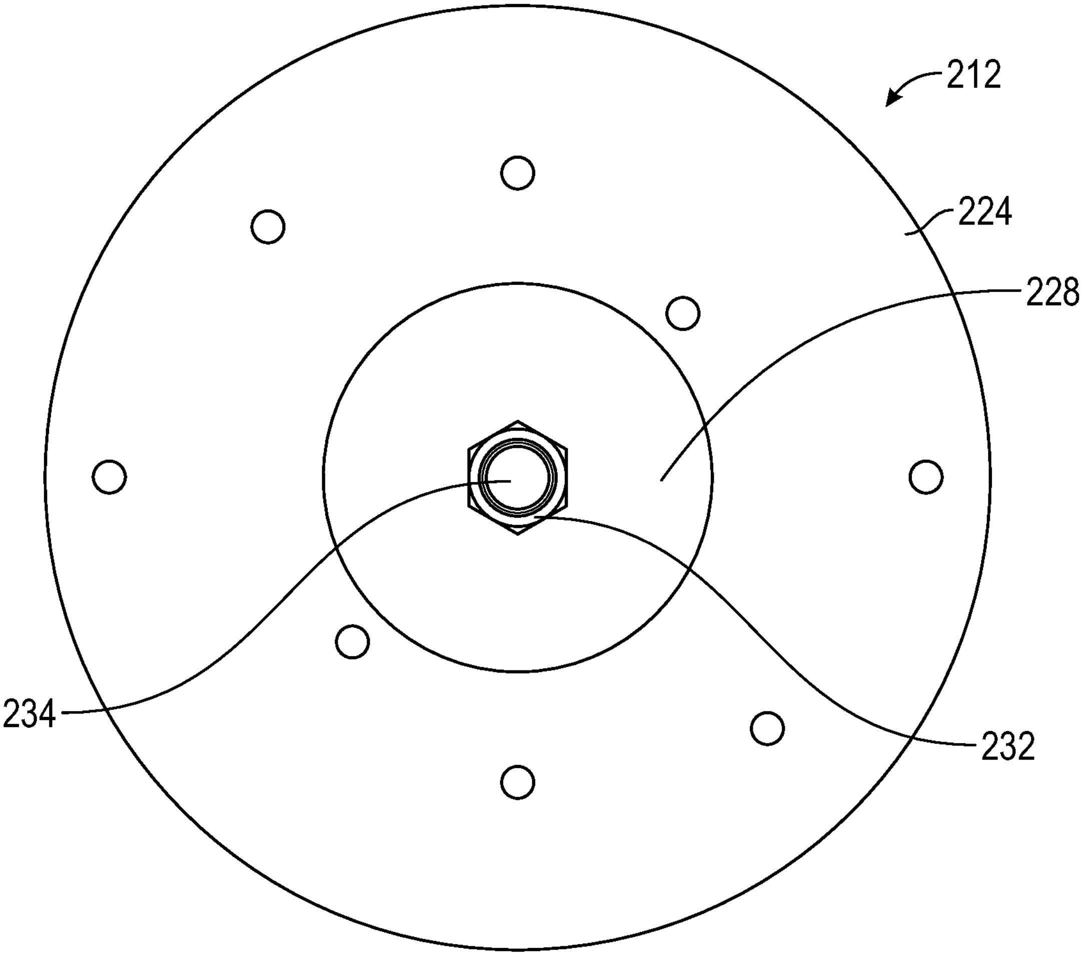
FIG. 10 is a side elevational view of the primary lift assembly.
Figure 11:
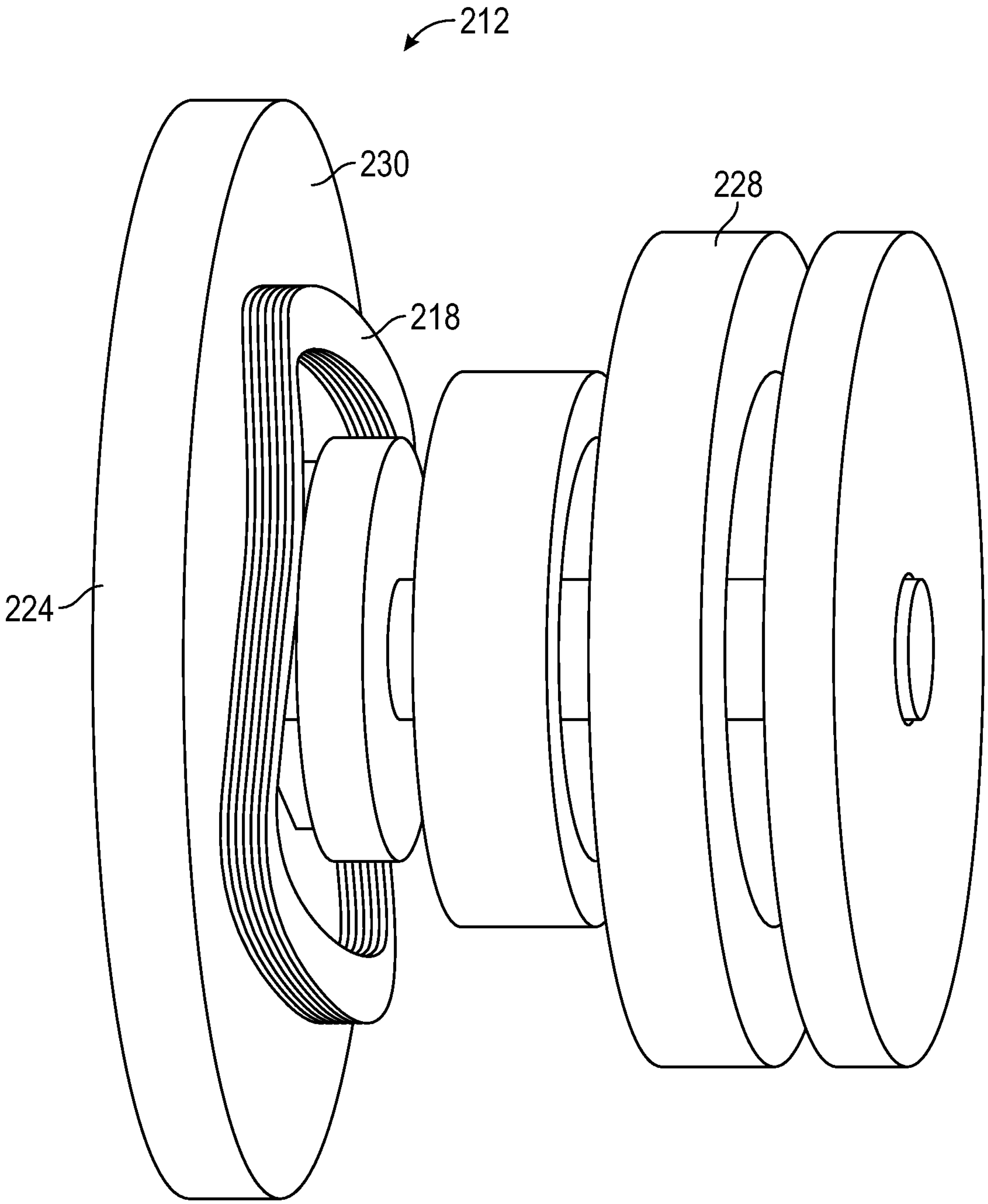
FIG. 11 is an exploded view of a portion of the primary lift assembly, illustrating a brake torque adjustment mechanism.

With particular reference to FIGS. 7-9, the primary lift assembly 200 includes a clutch assembly drive mechanism 212 that, importantly, functions to automatically decouple the drive mechanism (i.e., the motor 202 and sprockets 204, 206) from the lever arm 104 and spa cover 38 in the event loads in excess of prescribed loads are seen during a covering or uncovering operation. In particular, as shown therein, the first sprocket 204 is fixedly/rigidly connected to, such as via welding, a central hub 220. An opposite end of the hub 220 is fixedly/rigidly connected to a drive plate 214 having a first surface that faces the first sprocket 204 and an opposing second surface 215 that faces away from the first sprocket 204. As best shown in FIG. 8, the drive plate 214 includes a plurality of recesses or apertures 222, the purpose of which is described hereinafter. While the drive plate 214 is shown as being spaced from the sprocket 204 by the hub 220, it is contemplated that the first sprocket 204, itself, may include the plurality of recesses or apertures on the second surface 215 thereof (in which case a separate drive plate may not be necessary; that is, the first sprocket 204 can be driven directly by drive chain 208, as well as transmit rotational force directly to a clutch plate of the lift assembly 200).

As further shown in FIGS. 7-9, and as referenced above, the primary lift assembly 200 includes a clutch plate 224 axially aligned with the drive plate 214 and first sprocket 204. The clutch plate 224 carriers a plurality of ball bearings 216 on a drive plate-facing, first surface 226 thereof that are configured to be received in the corresponding recesses 222 on the second surface 215 of the drive plate 214. In this manner, the clutch plate 224 and the ball bearings 216 thereof, and the drive plate 214 and the recesses 222 thereof, for a ball-detent like mechanism, the function of which is hereinafter described. With further reference to FIGS. 7-9, the primary lift assembly 200 also includes an end plate 228 axially aligned with the first sprocket 204, the drive plate 214 and the clutch plate 224, and one or more spring elements 218 sandwiched between the end plate 228 and a second surface 230 of the clutch plate 224. In an embodiment, the spring elements 218 may be a plurality of stacked wave springs. As discussed hereinafter, the wave springs 218 function to bias the clutch plate 224 towards the drive plate 214, thereby urging the ball bearings 216 carried by the clutch plate 224 into the corresponding recesses 222 in the drive plate 214.

Importantly, the lever arm 104 is drivingly connected to the clutch plate 224 via a coupling member 210 for rotation for rotation of the lever arm 104 with the clutch plate 224. The coupling member 210 is slidably received through a central recess in the first sprocket 204, hub 220 and drive plate 214, but is not connected thereto, such that the first sprocket 204, hub 220 and drive plate 214 may be rotated without causing a corresponding rotation of the coupling member 210 and lever arm 104, for the purposes hereinafter described.

Figure 5:
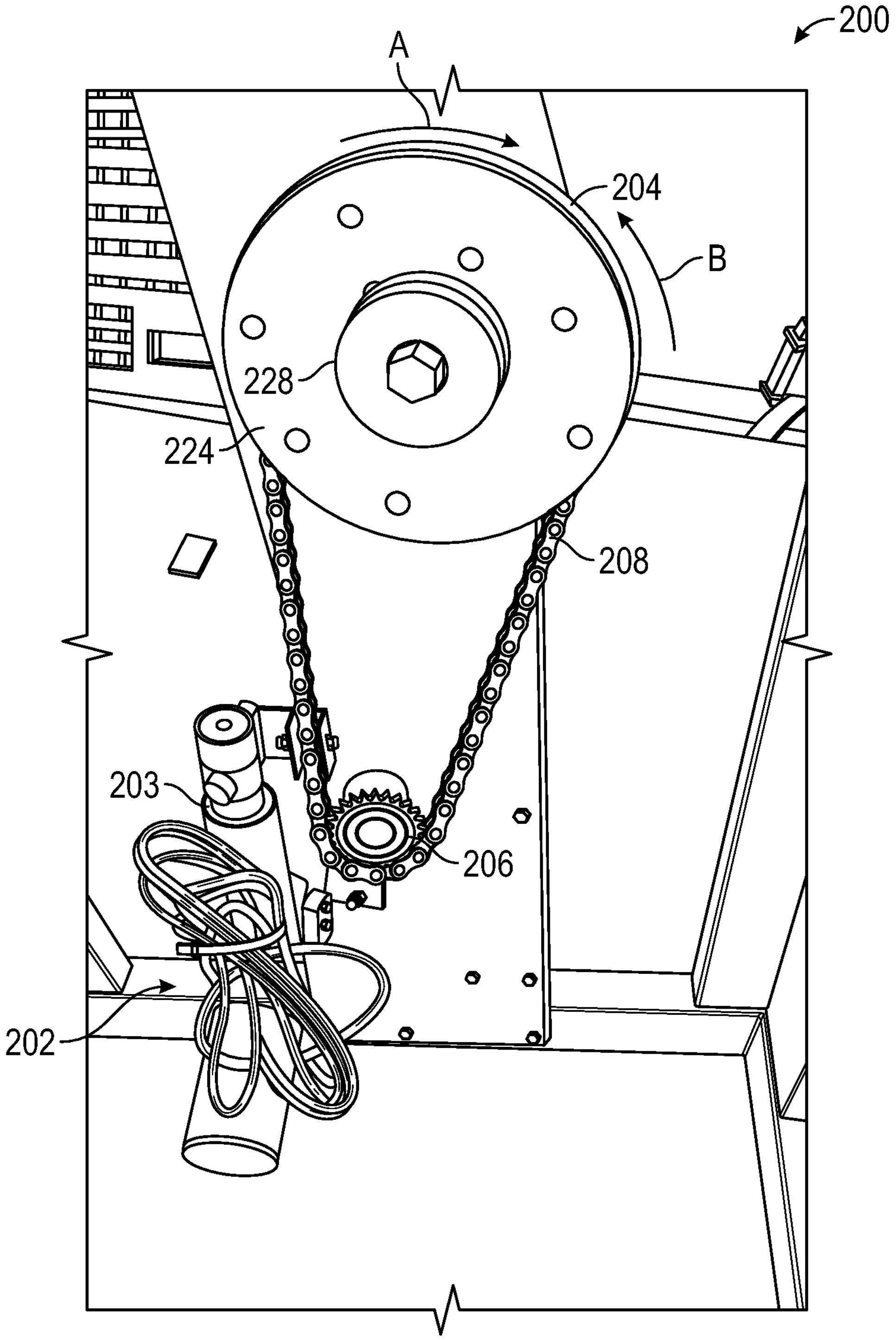
FIG. 5 is a perspective view of the primary lift assembly of the cover lift system.
Figure 6:
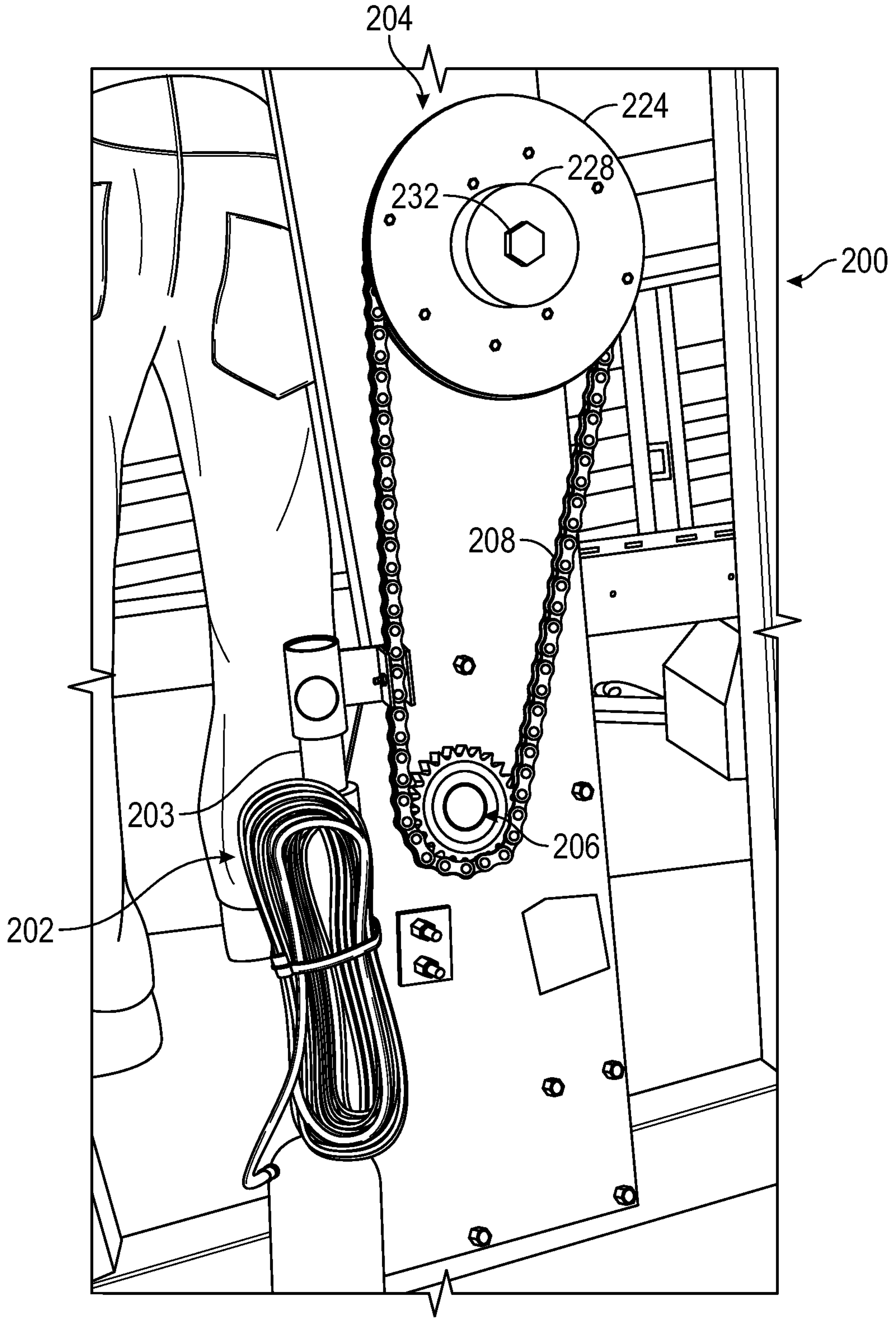
FIG. 6 is another perspective view of the primary lift assembly.

In operation, to effect covering or uncovering of the cover 38, the motor 202 is actuated to extend or retract the drive shaft 203, which moves the drive chain 208 upwardly or downwardly, causing the first sprocket 204 to rotate (pushing the chain upwardly causes the first sprocket 204 to rotate in the direction of arrow, A, in FIG. 5, while pulling downwardly on the chain 208 causes the first sprocket 204 to rotate in the direction of arrow, B, in FIG. 5. Importantly, because the drive plate 214 is fixedly connected to the first sprocket 204 via the hub 220, the drive plate 214 rotates along with the first sprocket 204. Rotation of the drive plate 214 causes a corresponding rotation of the clutch plate 224 via frictional engagement of the ball bearings 216 in the recesses 222 in the drive plate 214. In particular, the wave springs 218 bias the ball bearings 216 into the recesses 222 in the drive plate 214, creating a frictional engagement between the ball bearings 216 of the clutch plate 224 and the drive plate 214. This frictional engagement allows rotational forces to be transferred from the drive plate 214 to the clutch plate 224, effecting rotation of the clutch plate 224. As the lever arm 104 is fixedly connected to the clutch plate 224 via the coupling member 210, rotation of the clutch plate 224 thereby effects a corresponding rotation of the lever arm 104. Moreover, as the second end of the lever arm 104 is connected to the cover 38 via crossbar 120, rotation of the lever arm 104 thereby effects movement of the cover 38 between the open and closed positions (depending on the direction of rotation of the first sprocket 204).

As alluded to above, the wave springs 218 and clutch plate 224 form a clutch assembly 212 that serves to limit the forces seen by the drive mechanism (including at least the drive plate 214, first sprocket 204, and motor 202) during a covering or uncovering operation. In particular, in the event of an overload condition (e.g., a person or object is atop the cover 38), the ball bearings 216 will disengage from their seated positions within the recesses 22 in the drive plate 214, causing slippage between the drive plate 214 and the clutch plate 224, thereby preventing the drive mechanism (including the motor 202) from seeing excess loads that could damage components thereof, such as the motor. Indeed, if the torque exerted by the drive plate 214 (under rotational urging by the motor through the first sprocket) exceeds the frictional holding force exerted by the ball bearings 216 on the drive plate 214, then the drive plate 214 will 'slip' (it will rotate without imparting a corresponding rotation of the clutch plate 224).

In particular, if the torque exerted by the drive plate 214 exceeds the frictional force between the ball bearings 216 of the clutch plate 224 and the recesses 222 in the drive plate 214, then the drive plate 214 will rotate relative to the clutch plate 224, causing the ball bearings 216 to rise up out of the recesses/holes 222 in the drive plate 214. As the ball bearings 216 become unseated, the drive plate 214 exerts an axial force on the clutch plate 224 (through the ball bearings 216), causing the clutch plate 224 to move away from the drive plate 214 against the spring bias of the wave springs 218, thereby allowing the drive plate 214 to 'slip' relative to the clutch plate 224. This essentially decouples the cover 38 from the drive mechanism and motor 202 thereof if the cover sees an external load such as a snow load bank during opening, or somebody laying across the spa while the cover is closing.

Importantly, the ball bearings 216 become disengaged from the holes 222 at a preselected torque, which disconnects the cover from the actuator drive). In an embodiment, the stack of wave springs 218 is selected to provide the proper axial force to hold the drive balls 216 in the holes 222 for normal operation. In an embodiment, however, the axial force exerted by the wave springs 218 on the clutch plate 224 (which controls the toque at which disengagement will occur) may be selectively set or varied by tightening or loosening nut 232 received on threaded shaft 234 of the coupling member 210. In particular, tightening the nut 232 will push the end plate 228 towards the clutch plate 224, which compresses the wave springs 218 between the end plate 228 and clutch plate 224, causing the wave springs 218 to exert a greater axial fore on the clutch plate 224. This causes the balls 216 to more forcefully engage the recesses 222 in the drive plate 214, increasing the amount of torque necessary for disconnection. Similarly, loosening the nut 232 will move the end plate 228 away from the clutch plate 224, which lessens the biasing force the wave springs 218 exert on the clutch plate 224. This causes the balls 216 to less forcefully engage the recesses 222 in the drive plate 214, decreasing the amount of torque necessary for disconnection. In this respect, the biasing force exerted by the wave springs 218 controls/determines the 'sensitivity' of the breakaway mechanism.

The clutch assembly of the present invention is reversible and auto resetting by simply running the cover through an opening and closing cycle (after which the clutch assembly will reset itself and start moving the cover again). As indicated above, the wave spring stack allows 218 for axial movement of the clutch plate 224 as the balls 216 climb up out of the holes 222 in the drive plate 214 under overload conditions. This allows for disconnection of the clutch from the linear actuator drive system which protects both the mechanism itself from incurring any damage and safety for anyone who might be in the way of the moving cover. The wave springs 218 are used because they provide the above-mentioned functionality in a very small package that can fit inside the cramped conditions of the underside of a spa. Also, it is envisioned that the diameter of the holes 22 in which the balls 216 sit will be precisely controlled so that the force against the wave springs is the properly designed value.

As indicated above, the clutch 212 has a dual purpose: (1) to drive the handle 104 and cross bar 120 rotation to open and close the cover 38 and (2) to provide a safety brake mechanism in case someone or something is obstructing the cover movement. In particular, the ball bearings 216 disengage from their drive holes and protect the drive mechanism 202 and the person obstructing the cover. It can then be easily reengaged to normal functioning. The spring stack 218 (shown in FIGS. 7, 8 and 11) allows for adjustment of brake torque.

Further to the above, the drive plate 214 is manufactured with a Hardness Rockwell C in the range of about 45 to about 50 to provide the proper edge condition to interact with the ball bearings 216 and to provide sufficient surface strength so that excessive deformation does not occur when the ball bearings 216 ride up out of the holes 222 and roll across the second side surface 215 during over-torqueing.

As indicated above, the linear actuator 202 drives the chain and sprocket mechanism by pushing and pulling on the chain. This provides a constant radial torque lever (distance from the chain sprocket to the center of rotation) so that the actuator creates constant torque on the lever arm 104 throughout its rotation. The present invention further provides an adjustable chain tensioner (i.e., an adjustable chain bracket allowing for ¼ link adjustment by simply moving bolt position).

As illustrated in FIG. 9, the coupling member 210 includes a square socket/coupling to effectively transmit torque to the lever arm 104. This configuration also facilitates assembly and disassembly. In an embodiment, the lever arm 104 and/or coupling member 210 may be received in a steel bushing that extends through the sidewall of the spa, to bear lifting forces, and pin bearings may be utilized to bear the side loading forces of any small tilt in the cover.

The primary lift assembly 200 therefore provides for an automated, motor-driven means to open and close the cover 38. Importantly, the primary lift assembly 200 also includes a clutch and release system/mechanism, as described above, that allows for transmission of opening and closing torque to the handle 104 and cover 38, and provides a safety brake/release mechanism in case the cover 38 does not smoothly open or close such as due to an obstruction.

Figure 12:
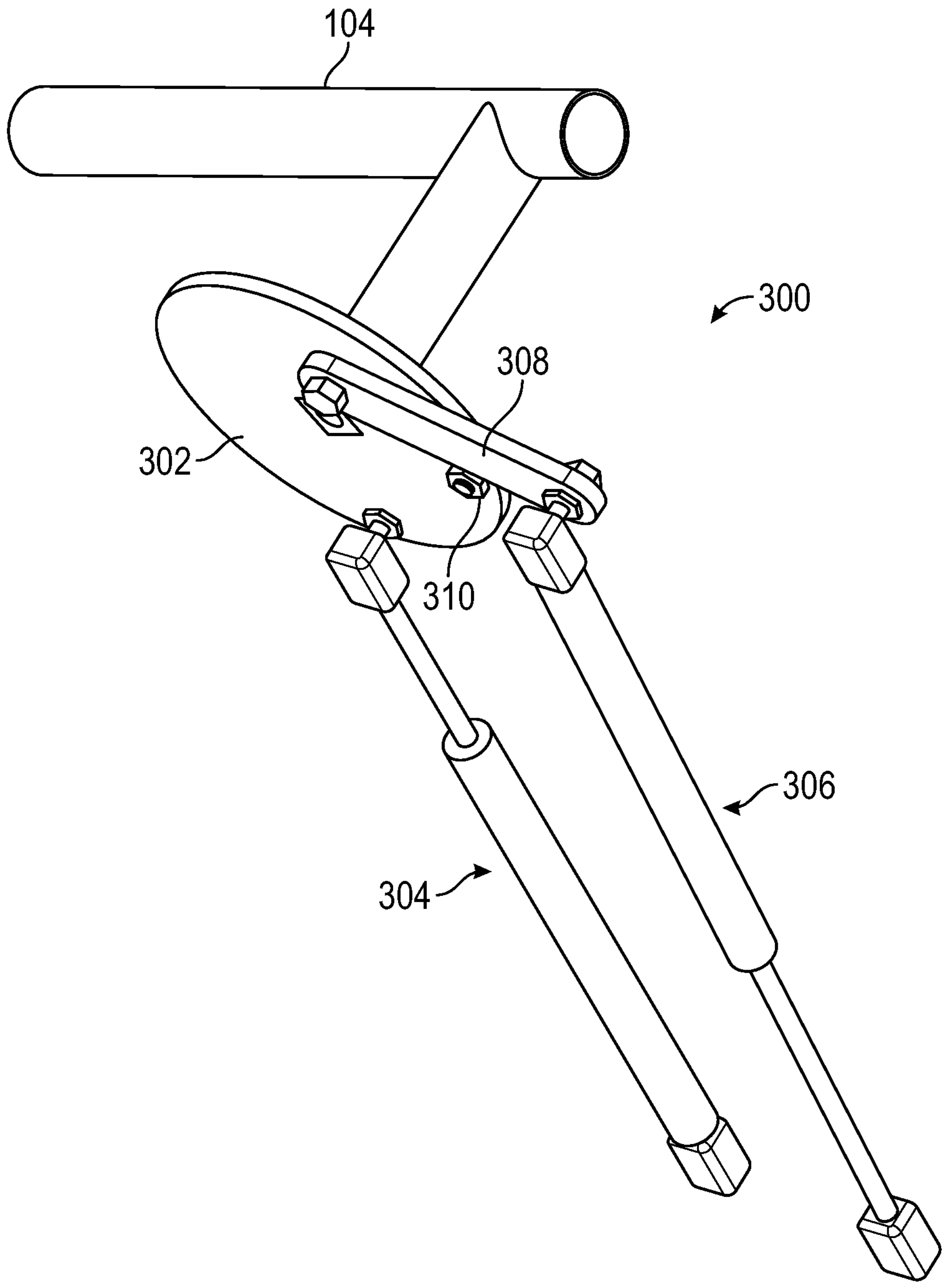
FIGS. 12 and 13 are perspective views of the secondary lift assembly, according to an embodiment of the present invention.
Figure 13:
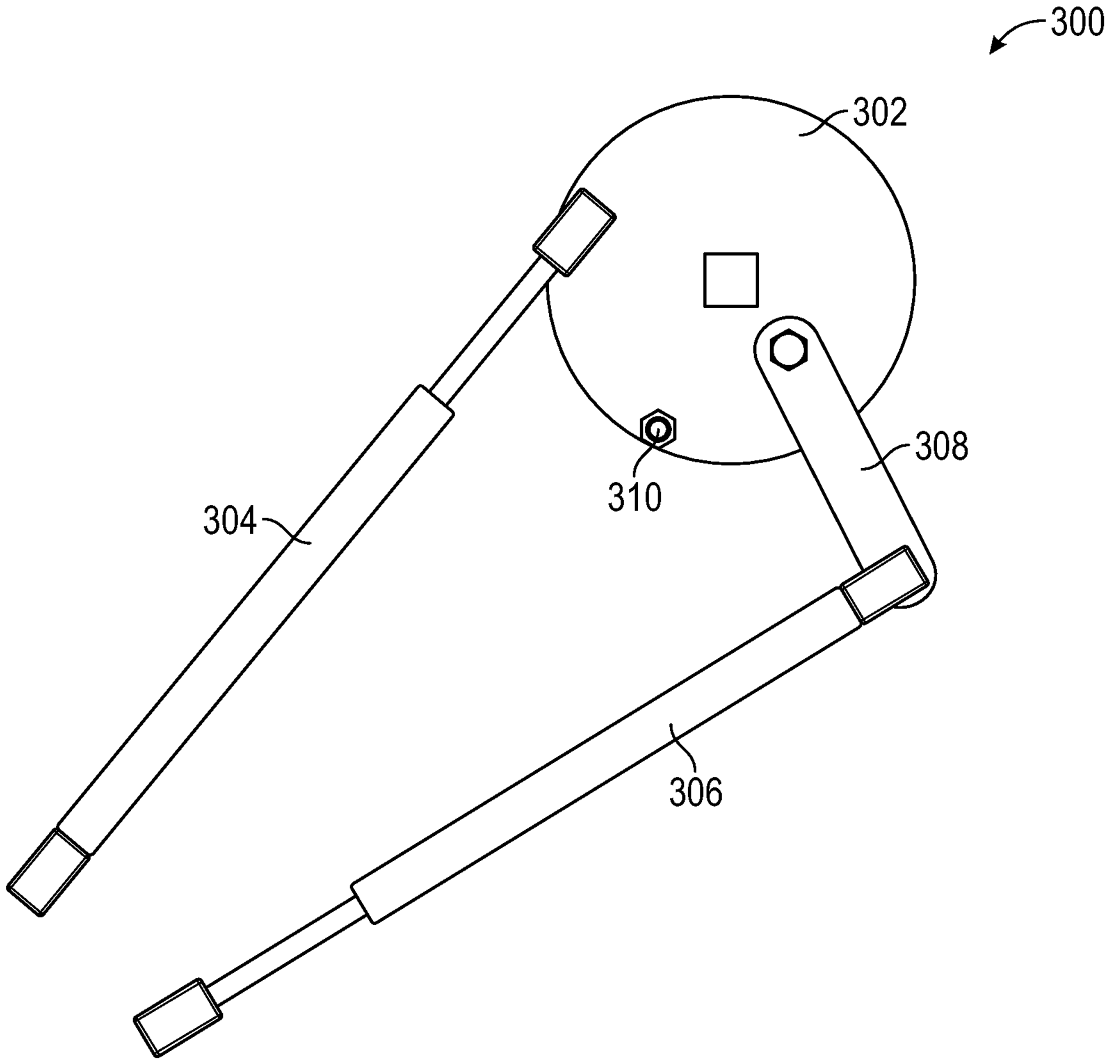

Turning now to FIGS. 12-21, detailed views of the secondary lift assembly 300 are shown. The secondary lift assembly 300, as described above, is located on an opposite side of the spa 10 from the primary lift assembly 200, and includes a disk 302 rigidly connected to the lever arm 104 (associated with the secondary lift assembly 300) and/or cross rod 120 behind sidewall 14 for common rotation with the lever arm 104 and/or connecting rod 120. The secondary lift assembly 300 further includes first and second lift-assist devices 304, 306 operatively connected to disk 302 adjacent to an outer periphery thereof. As illustrated in FIG. 12, the first lift-assist device 304 is directly coupled to the disk 304, while the second lift-assist device 306 is coupled to the disk 302 via a linkage 308. In particular, the second lift device 306 is pivotally connected to a first end of linkage 308, while the second end of the linkage 308 is pivotally connected to the disk 302. Respective distal ends of the first and second lift-assist devices 304, 306 are configured to secure and rigid coupling to sidewall 14 of the spa. In an embodiment, a mounting bracket (identified by reference numeral 320 in FIGS. 18-21) may be utilized to connect the lift-assist devices 304, 306 to the sidewall 14 of the spa 10.

Figure 14:
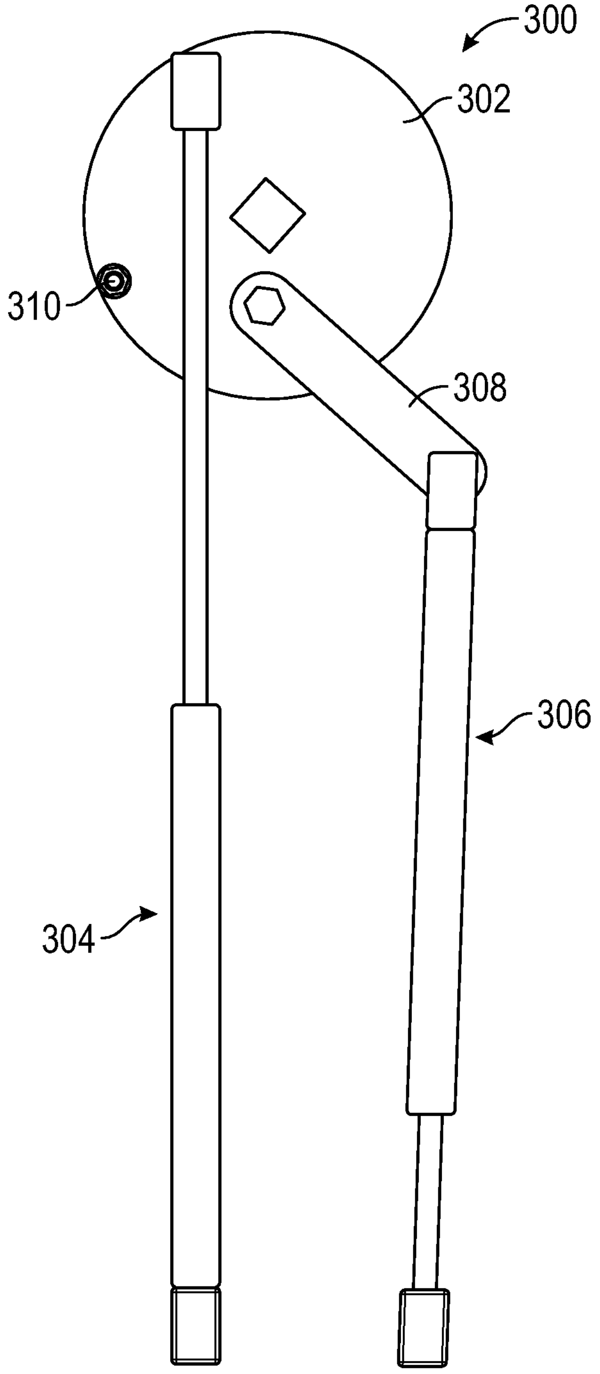
FIG. 14 is a side elevational view of the secondary lift assembly, showing the secondary lift assembly in a closed position of the spa cover.
Figure 15:
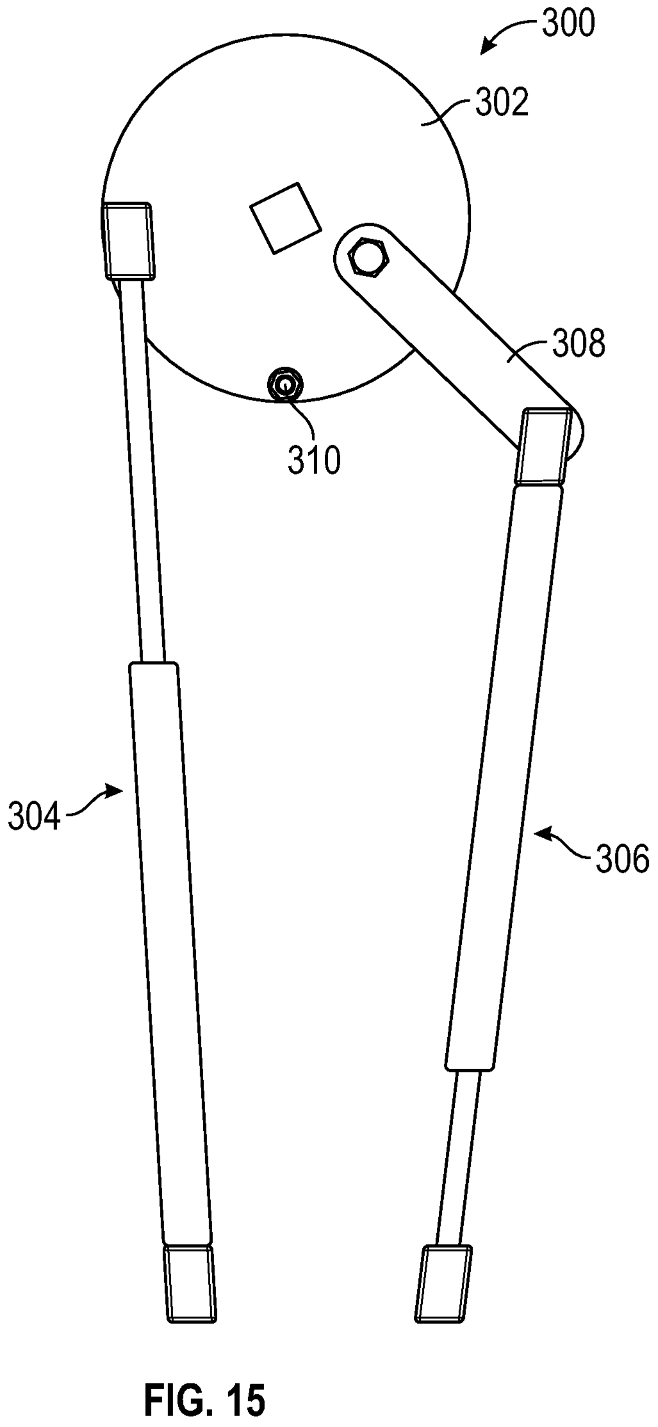
FIG. 15 is a side elevational view of the secondary lift assembly, showing the position of the secondary lift assembly as the spa cover moves from the closed position to an open position.
Figure 16:
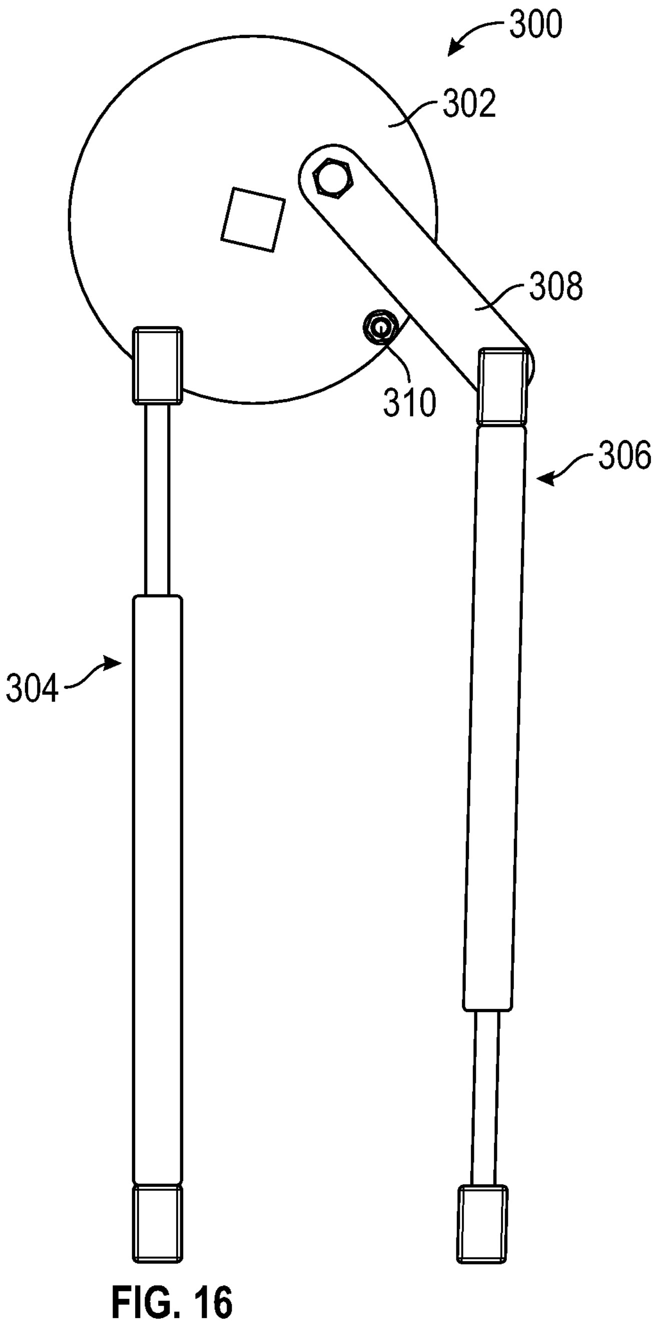
FIG. 16 is a side elevational view of the secondary lift assembly, showing the position of the secondary lift assembly as the spa cover moves further from the closed position to the open position.

Importantly, the first lift-assist device 304 is a compression spring that is loaded so that that when the cover 38 is closed, the first lift-assist device 304 provides rotational torque on the disk to provide downward force on the cover 38, thus providing for a positive seal of the cover 38 when it is closed. This position is best illustrated in FIG. 14. In operation, as the automatic drive mechanism of the primary lift assembly 200 opens the cover 38, the compression spring (i.e., first lift-assist device 304) provides lift that helps keep the cover 38 level and set it down gently towards the ground. In particular, the first lift-assist device 304 provides an upward force on the cover 38 as it rotates past vertical to help lower it gently, as well as aids in lifting the cover 38 from the ground during a closing operation. FIGS. 15 and 16 illustrate the position of the secondary lift assembly 300 (and the position of the first and second lift-assist devices 304, 306) as the cover moves towards the fully open position.

Figure 17:
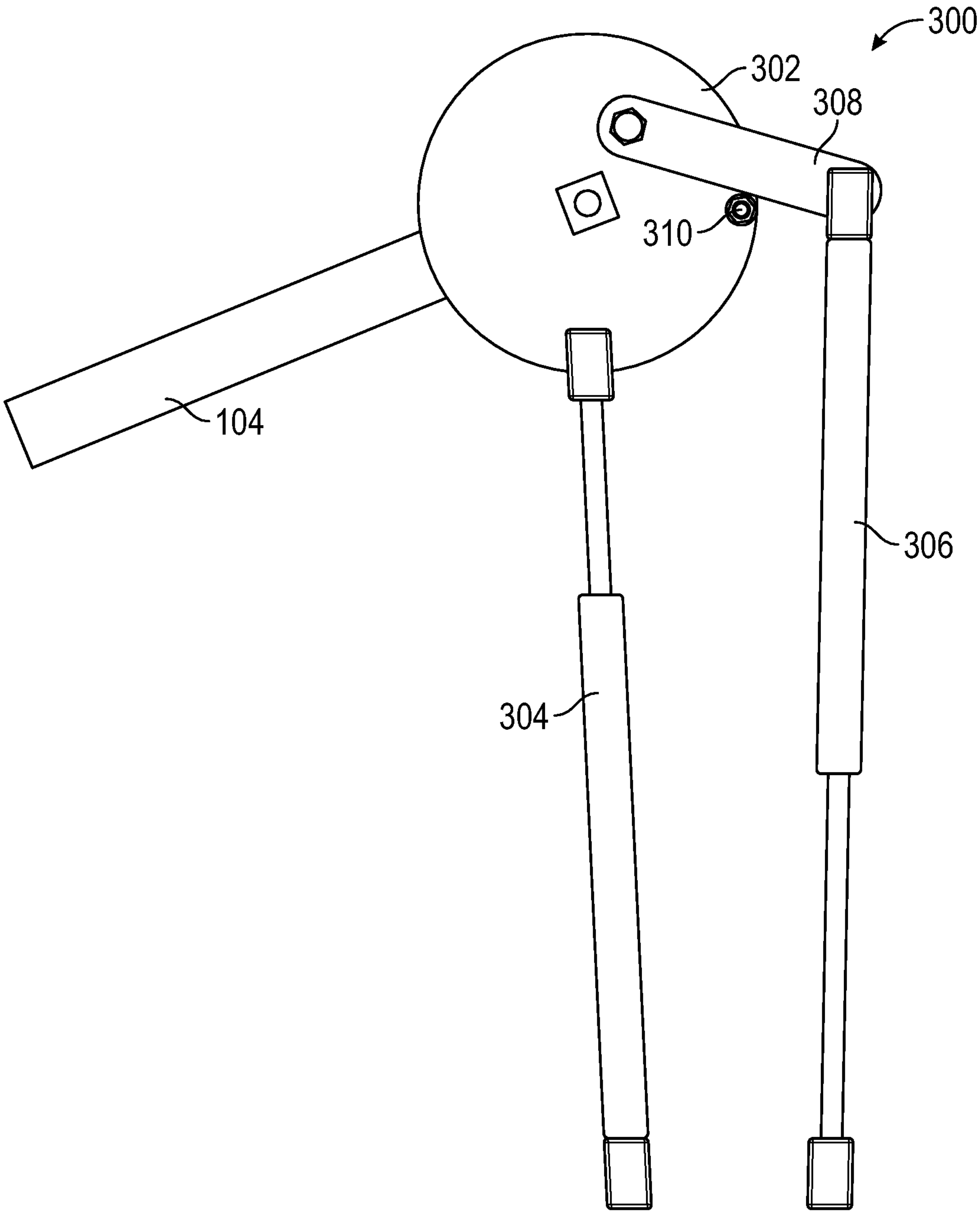
FIG. 17 is a side elevational view of the secondary lift assembly, showing the secondary lift assembly in a fully open position of the spa cover.
Figure 18:
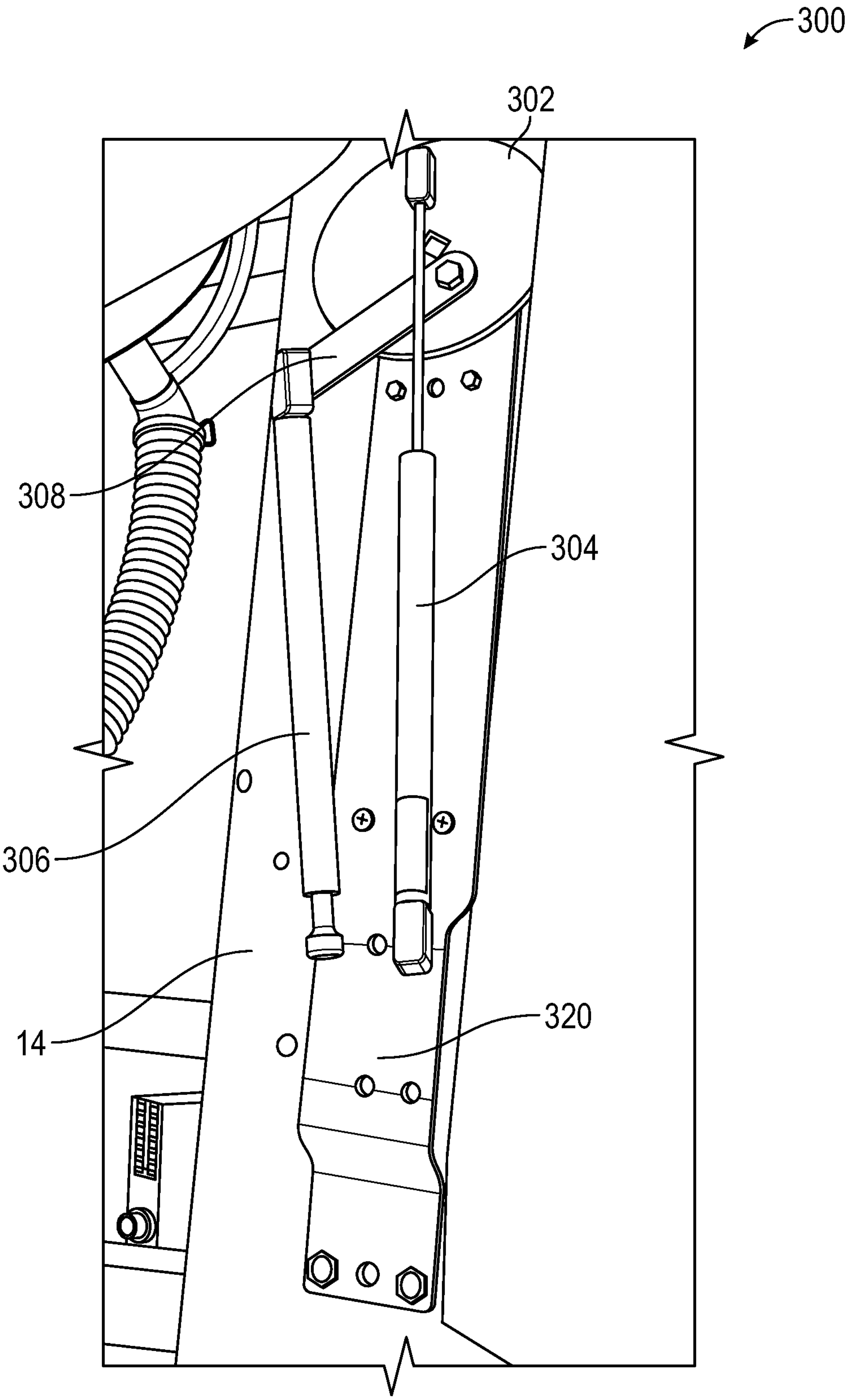
FIGS. 18-21 illustrate the secondary lift assembly in various positions as the spa cover is moved from the closed position to the open position.
Figure 19:
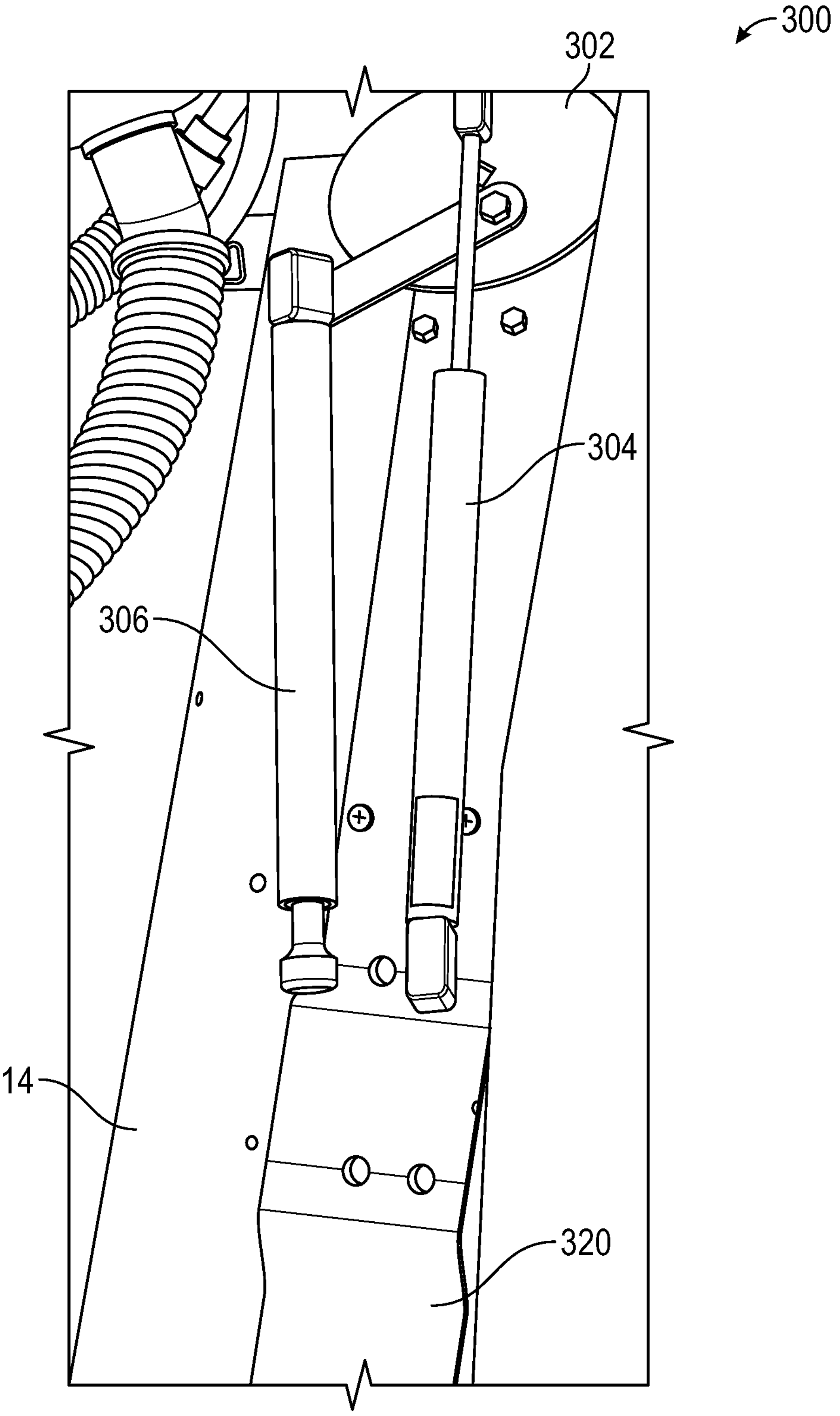
Figure 20:
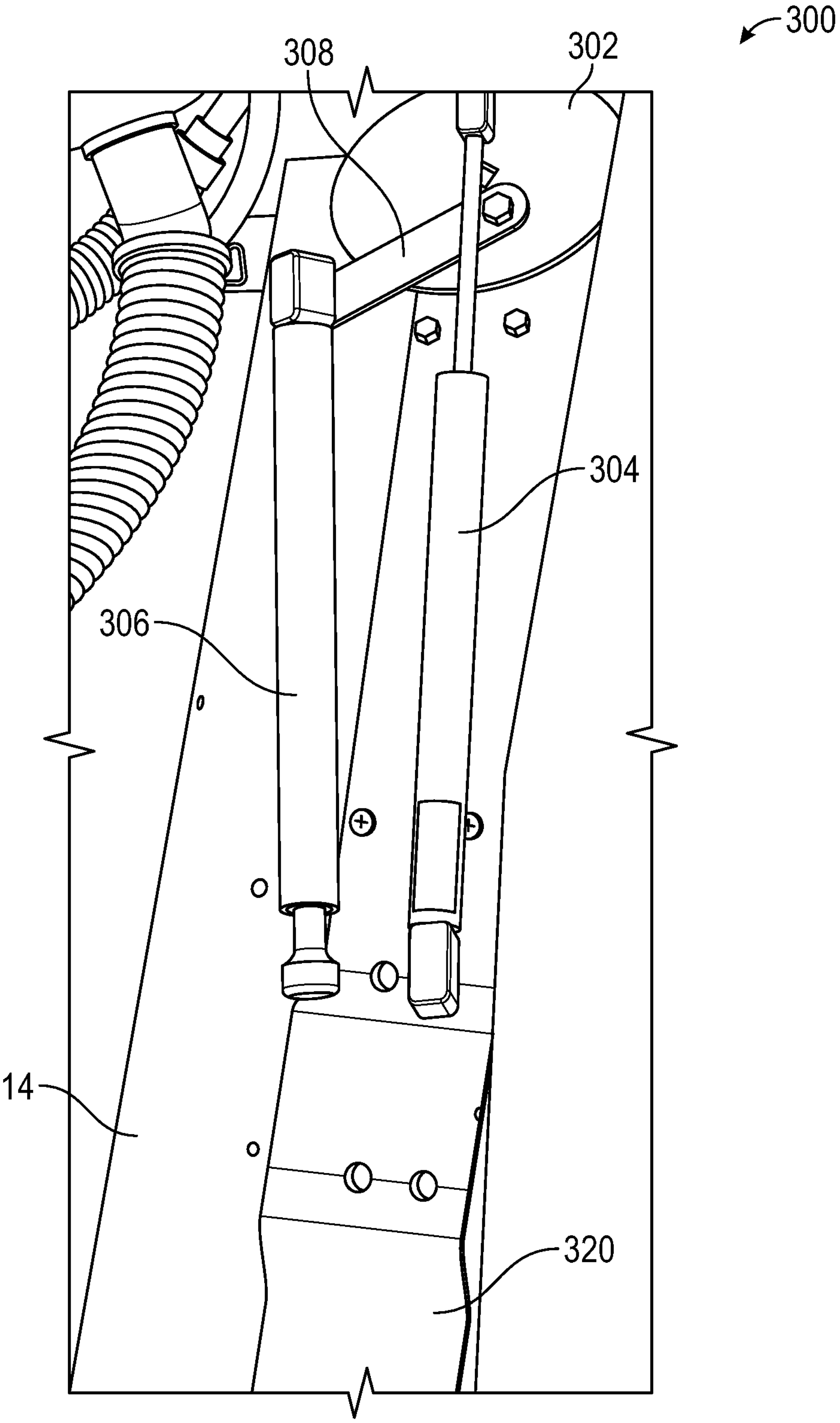
Figure 21:
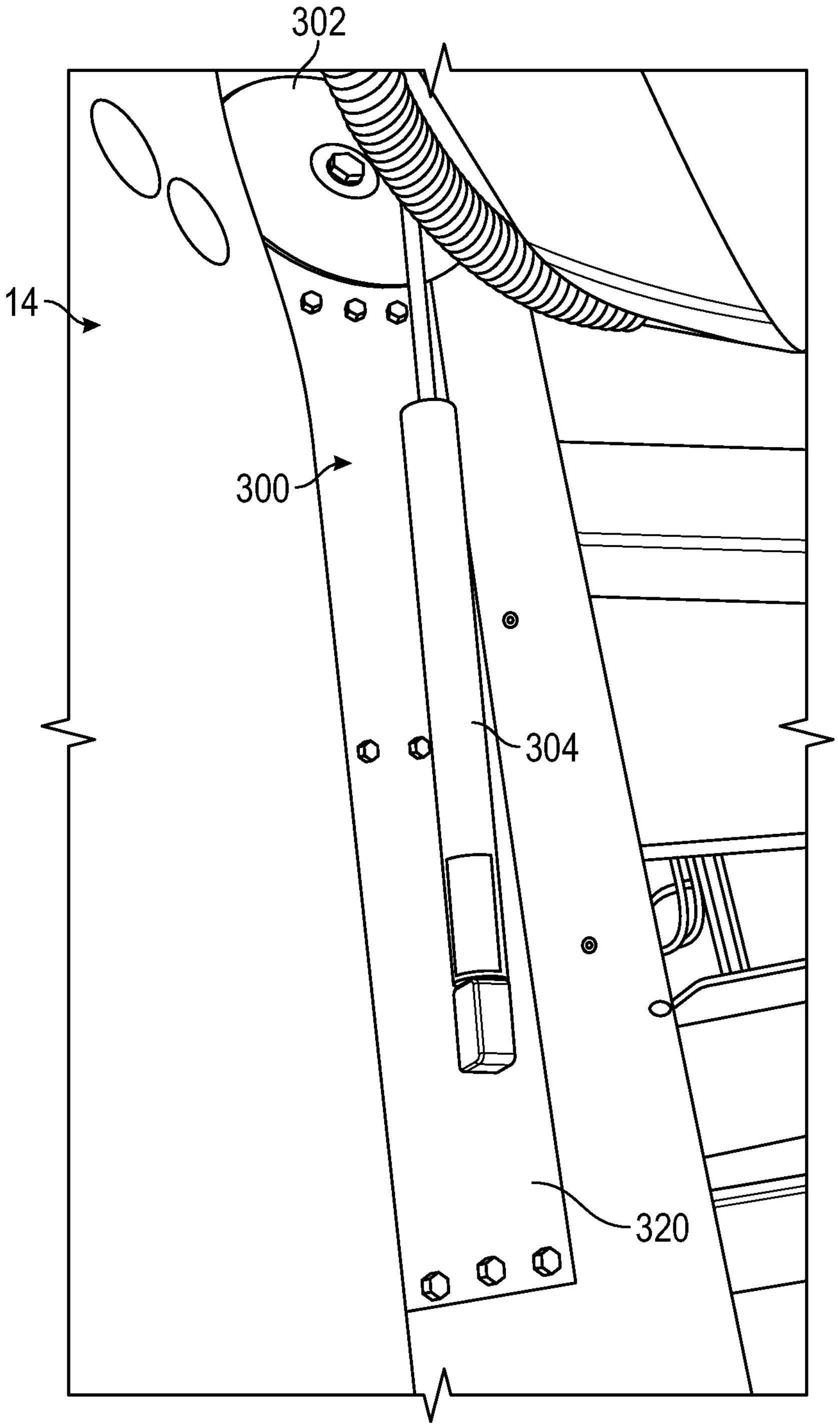

With reference to FIG. 17, in the fully open position of the cover 38, the compression spring (i.e., first lift-assist device 304) is fully compressed, and is almost directly under the center of rotation of the disk 302. In this position, there is substantially no appreciable side vector to provide for a rotational torque on the disk 302. That is where the second lift-assist device 306, configured as a traction spring or tension spring, comes into play.

As discussed above, the second lift-assist device 306 is attached to the linkage 308 that is free to rotate and it provides no torque on the system until the linkage 308 comes in contact with a bolt head or protrusion 310 on the side of the disk 302. In particular, the linkage 308 rotates freely until predetermined angle of rotation of disk 302 is reached, while the cover 38 is opening. As the cover 38 advances downward vertically, the linkage 308 engages the position stop 310 and then applies a load to the traction spring 306 attached to it. This creates positive torque that acts to slow the decent of the cover 38. In particular, as the cover 38 falls over the side of the spa, the disk rotates 302 to the position where the lever/linkage 308 contacts the bolt 310, and the traction spring (i.e., second lift-assist device 306) starts to stretch and provide significant torque to the system helping set the cover down gently.

In addition, when the cover 38 comes to rest adjacent the side of the spa, the second lift-assist device 306 provides a constant upward force (torque) that aids in lifting the cover back up onto the spa (this lever mechanism divides the load between itself and the linear actuator of the primary lift assembly 200, reducing the force the actuator has to produce by half). In particular, when the drive mechanism of the primary lift assembly 200 reverses to close the cover 38, this traction spring (i.e., second lift-assist device 306) provides significant torque to help the drive pick the cover up off the ground. In particular, it provides enough torque to level the cover 38 during lifting so that no binding occurs due to cover tilt and overloads the drive mechanism.

The second lift-assist device 306 continues to help the actuator lift the cover until the compression air spring 304 rotates into position to provide similar torque at which time the linkage 308 disengages and the actuator and compression spring 304 complete the rotation to closure of the cover. This lever mechanism (i.e., lift-assist device 306 and linkage 308) engages to assist the control of the decent of the cover and disengages halfway during the ascent of the cover so that the forces and torques can be controlled within acceptable limits, from the downforce on the closed cover, to a strong force to resist freefall while opening but allowing full travel to fully open, then to a strong assist force to help the actuator lift the cover back on the spa. Importantly, the second lift-assist device 306 is designed to disengage during the closing cycle so that it doesn't add to the closing torque and provide too much closing force.

Importantly, the compression spring (i.e., first lift-assist device 304) and traction spring (i.e., second lift-assist device 306) of the secondary lift assembly 300 work in concert with one another to provide steady rotational torque during the entire opening and closing operations. This passive, secondary lift assembly 300 allows the cover to be lowered and raised evenly with the active actuator. This way the cover does not tilt to either side creating too much side loading of the lift system resulting in binding of the entire cover lift system.

In an embodiment, the first and second lift-assist devices 304, 306 may be air springs (configured as compression and traction/tension air springs, respectively), although other lift-assist devices such as hydraulic devices, mechanical springs and the like may also be utilized without departing from the broader aspects of the invention. In some embodiments, it is contemplated that a double-damping air spring may be employed, which functions as a sort of shock to smooth out the entire motion of the cover.

The present invention therefore provides both 'active' (i.e., the primary lift assembly) and 'passive' (i.e., the secondary lift assembly 300) lift assemblies that work in tandem to facilitate smooth opening and closing of a spa cover. In particular, while the primary lift assembly 200 provides active, i.e., motor-driven force for opening the spa cover 38, the secondary lift assembly 300 provides an auxiliary opening and closing force to supplement the force provided by the primary lift assembly 200. In addition, the secondary lift assembly 300 provides for smooth and leveling movement of the cover 38 between the open and closed position, and vice versa. The present invention therefore minimizes the likelihood of an uneven torque being applied to the over, which could result in uneven movement and/or binding of the cover.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

What is claimed is:

1. A lift system for a spa cover, comprising:

a first arm rotatable about a first pivotal connection with a side of a spa and pivotally connected to a spa cover;

a lift mechanism configured to provide for rotation of the first arm about its pivotal connection to the side of the spa; and a mechanical linkage between the lift mechanism and the first arm;

wherein the lift mechanism is a linear actuator which is connected to the mechanical linkage at a point offset from the first pivotal connection.

2. The lift system of claim 1, wherein:
the linear actuator is pivotally connected to the mechanical linkage.

3. The lift system of claim 2, wherein:
the mechanical linkage converts linear translation of the linear actuator to rotation of the first arm about the first pivotal connection.

4. The lift system of claim 2, wherein:
a proximal end of the mechanical linkage is connected to the spa at a point generally beneath the first pivotal connection.

5. A lift system for a spa cover, comprising:
a first arm rotatable about a first pivotal connection with a side of a spa and pivotally connected to a spa cover;
a lift mechanism configured to provide for rotation of the first arm about its pivotal connection to the side of the spa; and
a mechanical linkage between the lift mechanism and the first arm;
wherein the mechanical linkage includes a first linkage and a second linkage.

6. The lift system of claim 5, wherein:
the lift mechanism is an actuator.

7. The lift system of claim 6, wherein:
the actuator is a linear actuator.

8. The lift system of claim 5, wherein:
the lift mechanism is pivotally connected to the first linkage; and
wherein the first linkage is pivotally connected to the second linkage.

9. The lift system of claim 8, wherein:
the first linkage is a linear, elongated member.

10. The lift system of claim 9, wherein:
the second linkage is a disk.

11. A lift system for a spa cover, comprising:
a first arm rotatable about a first pivotal connection with a side of a spa and pivotally connected to a spa cover;
a lift mechanism configured to provide for rotation of the first arm about its pivotal connection to the side of the spa;
a mechanical linkage between the lift mechanism and the first arm; and
a mechanism configured to inhibit rotation of the first arm during rotation of the first arm.

12. A lift system for a spa cover, comprising:
a first arm rotatable about a first pivotal connection with a side of a spa and pivotally connected to a spa cover;
a lift mechanism configured to provide for rotation of the first arm about its pivotal connection to the side of the spa, the lift mechanism being a linear actuator;
a mechanical linkage between the lift mechanism and the first arm; and
an eccentric drive plate connected to the first arm;
wherein the mechanical linkage is between the eccentric drive plate and the linear actuator.

13. A lift system for a spa cover, comprising:
a first arm rotatable about a first pivotal connection with a side of a spa and pivotally connected to a spa cover;
a lift mechanism configured to provide for rotation of the first arm about its pivotal connection to the side of the spa, the lift mechanism being a linear actuator; and
a mechanical linkage between the lift mechanism and the first arm;
wherein the mechanical linkage is a linear actuator; and
wherein the linear actuator and the mechanical linkage are positioned behind the side of the spa.

14. A spa, comprising:
a housing defining an interior chamber for containing a volume of water;
a cover positionable over the housing; and
a cover lifter, the cover lifter including:
a first arm rotatable about a first pivotal connection with a side of the housing and connected to the cover;
a lift mechanism configured to provide for rotation of the first arm about its pivotal connection to the side of the housing; and
a mechanical linkage between the lift mechanism and the first arm;
wherein the lift mechanism is a linear actuator; and
wherein the mechanical linkage converts linear translation of the linear actuator to rotation of the first arm about the first pivotal connection.

15. The spa of claim 14, wherein:
the linear actuator is connected to the mechanical linkage at a point offset from the first pivotal connection.

16. The spa of claim 14, wherein:
the mechanical linkage includes a first linkage and a second linkage.

17. The lift system of claim 16, wherein:
the linear actuator pivotally connected to the first linkage; and
wherein the first linkage is pivotally connected to the second linkage.

* * * * *